US011418604B2

(12) United States Patent
Guha

(10) Patent No.: US 11,418,604 B2
(45) Date of Patent: Aug. 16, 2022

(54) LOCAL SERVERS TO MANAGE STORAGE ACROSS CLIENT DEVICES IN AN INTERMITTENT NETWORK

(71) Applicant: Hewlett-Packard Development Company, L.P., Spring, TX (US)

(72) Inventor: Biswaroop Guha, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,161

(22) PCT Filed: Jun. 7, 2018

(86) PCT No.: PCT/US2018/036532
§ 371 (c)(1),
(2) Date: Oct. 16, 2020

(87) PCT Pub. No.: WO2019/236093
PCT Pub. Date: Dec. 12, 2019

(65) Prior Publication Data
US 2021/0152646 A1 May 20, 2021

(51) Int. Cl.
*H04L 29/08* (2006.01)
*H04W 84/12* (2009.01)
*H04L 67/51* (2022.01)
*H04L 67/55* (2022.01)

(52) U.S. Cl.
CPC .............. *H04L 67/16* (2013.01); *H04L 67/26* (2013.01); *H04W 84/12* (2013.01)

(58) Field of Classification Search
CPC ....... H04L 67/16; H04L 67/26; H04L 47/823; H04L 67/1097; H04L 67/2842; H04L 67/34; H04W 84/12
See application file for complete search history.

(56) References Cited

U.S. PATENT DOCUMENTS

| 6,760,748 B1 * | 7/2004 | Hakim | G09B 5/14 434/350 |
| 7,016,949 B1 | 3/2006 | Tagawa | |
| 8,676,922 B1 | 3/2014 | Milner | |

(Continued)

FOREIGN PATENT DOCUMENTS

| CN | 105787837 A | 7/2016 |
| EP | 670543 A | 9/1995 |

(Continued)

*Primary Examiner* — Javier O Guzman
(74) *Attorney, Agent, or Firm* — Fabian VanCott

(57) ABSTRACT

A local server for managing storage across client devices in an intermittent network may include a processor, and a memory communicatively coupled to the processor. The local server may also include an internet connection manager to manage data transfer from an internet to the local server, and a wireless local area network (LAN) access point to communicatively couple at least one local client device to the local server. The local server manages the local client device to use the local server as a proxy server. The local server may also include a local network manager. The local network manager may include an update manager to push data downloaded by the local server device to the local client device based on relevancy of the data to a user of the local client device.

20 Claims, 6 Drawing Sheets

(56) References Cited

U.S. PATENT DOCUMENTS

| | | |
|---|---|---|
| 8,874,700 B2 | 10/2014 | Chan et al. |
| 8,996,647 B2 | 3/2015 | Lingafelt et al. |
| 9,083,774 B2 | 7/2015 | Hitomi et al. |
| 9,602,950 B1 | 3/2017 | Gonzalez et al. |
| 9,736,119 B2 | 8/2017 | Monk et al. |
| 2003/0018605 A1* | 1/2003 | Policastro ............. G06F 16/283 |
| 2003/0027112 A1* | 2/2003 | Warneke ................. G09B 7/02 434/167 |
| 2004/0027611 A1 | 2/2004 | Leiman et al. |
| 2004/0202987 A1* | 10/2004 | Scheuring ............... G09B 7/02 434/118 |
| 2008/0052366 A1* | 2/2008 | Olsen .................. H04L 67/2852 709/206 |
| 2011/0117534 A1* | 5/2011 | Berger ..................... G09B 5/08 434/350 |
| 2011/0269424 A1 | 11/2011 | Multer et al. |
| 2013/0007227 A1 | 1/2013 | Hitomi et al. |
| 2013/0031356 A1 | 1/2013 | Prince et al. |
| 2013/0191445 A1* | 7/2013 | Gayman ........... H04L 29/06047 709/203 |
| 2013/0311593 A1 | 11/2013 | Prince et al. |
| 2014/0068705 A1 | 3/2014 | Chambers et al. |
| 2014/0237070 A1 | 8/2014 | Choi et al. |
| 2014/0280195 A1* | 9/2014 | Etzioni .................... G09B 5/12 707/741 |
| 2014/0280976 A1 | 9/2014 | Gillotte et al. |
| 2014/0365631 A1* | 12/2014 | Luna ..................... H04W 76/25 709/223 |
| 2015/0113523 A1 | 4/2015 | Nichols et al. |
| 2015/0135259 A1* | 5/2015 | Ilyadis ............... H04L 63/0281 726/1 |
| 2015/0282061 A1* | 10/2015 | Matthews .............. H04W 4/90 455/404.2 |
| 2015/0350368 A1* | 12/2015 | Tan ...................... G06F 16/172 709/213 |
| 2016/0012739 A1* | 1/2016 | Jafari ...................... G09B 5/06 709/204 |
| 2016/0085985 A1 | 3/2016 | Echeverria |
| 2016/0088022 A1 | 3/2016 | Handa et al. |
| 2016/0226972 A1 | 8/2016 | Mahankali |
| 2016/0316314 A1* | 10/2016 | Swaminathan ......... H04L 67/28 |
| 2017/0083597 A1 | 3/2017 | Alva et al. |
| 2017/0302550 A1 | 10/2017 | Leemet et al. |
| 2018/0247029 A1* | 8/2018 | Fish ...................... G16H 15/00 |

FOREIGN PATENT DOCUMENTS

| | | |
|---|---|---|
| EP | 2106079 A1 | 9/2009 |
| EP | 2262169 A1 | 12/2010 |
| KR | 10-2005-0119792 A | 12/2005 |
| KR | 10-2009-0004066 A | 1/2009 |

* cited by examiner

LOCAL SERVERS TO MANAGE STORAGE ACROSS CLIENT DEVICES IN AN INTERMITTENT NETWORK

BACKGROUND

Access to large amounts of data obtainable via computing networks such as the Internet has become ubiquitous throughout many portions of the world. The Internet may provide vast amounts of knowledge. In this manner, networks may be used to educate individuals through access to educational sources made available over the Internet.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
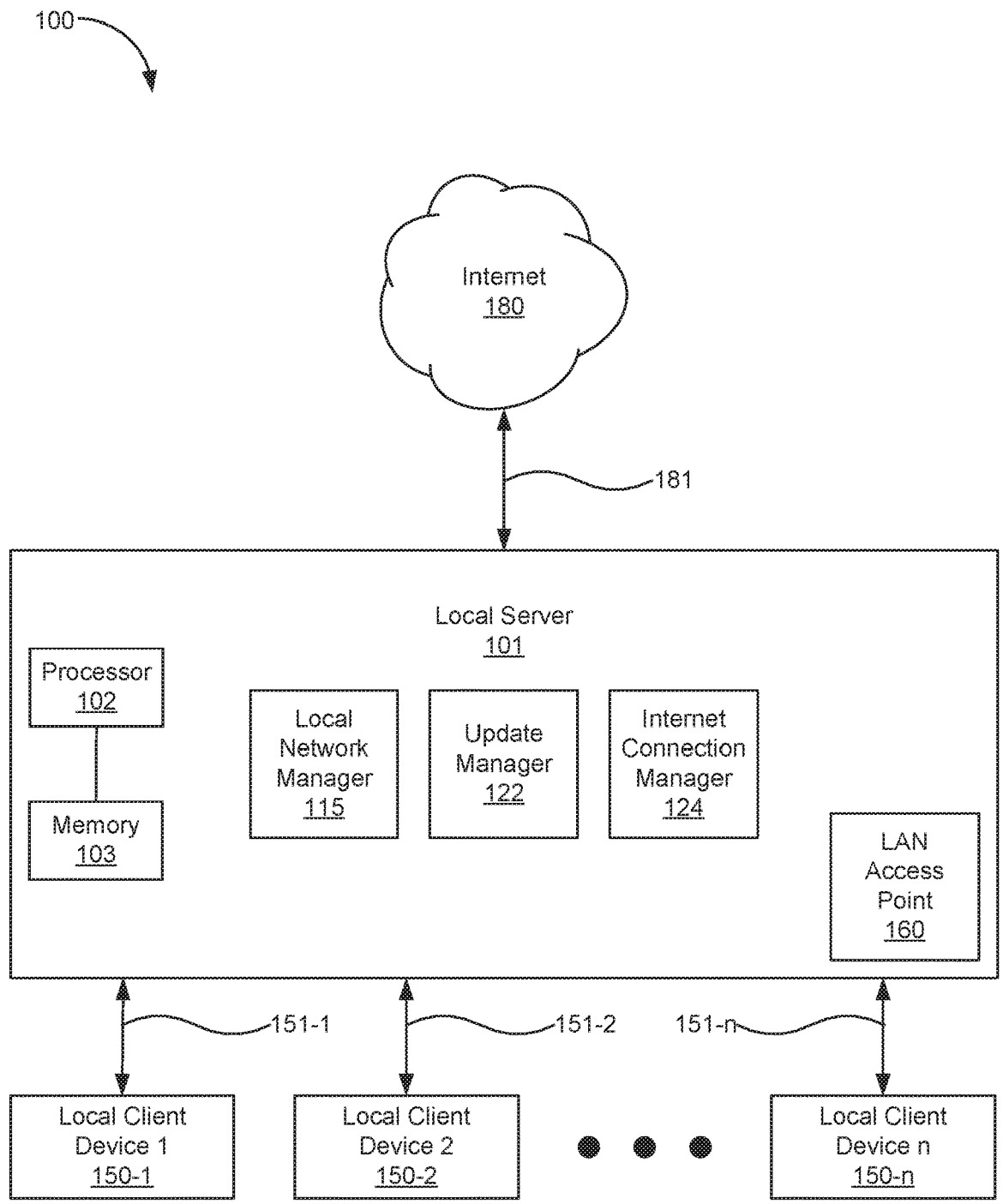
FIG. 1 is a block diagram of a local sever for managing storage across client devices in an intermittent network, according to an example of the principles described herein.

Throughout the drawings; identical reference numbers designate similar, but not necessarily identical; elements. The figures are not necessarily to scale, and the size of some parts may be exaggerated to more clearly illustrate the example shown. Moreover; the drawings provide examples and/or implementations consistent with the description; however, the description is not limited to the examples and/or implementations provided in the drawings.

DETAILED DESCRIPTION

In many other areas of the world, access to, for example, the Internet, is not available or is at least intermittent, is plagued with slow upload and download speeds, and is expensive. There are several reasons as to why these areas of the world do not have quality access to the internet, including lack of network infrastructure, and economies of those countries experiencing low Internet connectivity, among other issues. Because of this lack of access, many aspects of that area of the world may suffer including its economy, its communication with other areas of the world, and the education of its inhabitants. For example, in many kindergarten through grade 12 (K-12) schools in emerging or developing countries, there may exist limited or no access to Internet. Teachers and students often rely on digital media freely available as a learning resource. These types of learning resources may include Open Education Resources (OERs) such as KHAN ACADEMY online learning website available at https://www.khanacademy.org, or teaching curriculum disseminated by governmental education agencies.

However, in schools of emerging or developing countries where access to the Internet is intermittent, these types of online resources are not made available because of the lack of reliable access to the Internet and the resources provided thereon. Examples described herein provide a solution for easy deployment and configuration of a local network, with or without access to the Internet that significantly simplifies sharing of digital content within the local network such as a school. Examples described herein optimize the bandwidth available to the local network, while maximizing the utilization of computing and printing resources via the local network. Examples described herein describe managing an intermittent network connection by detecting when there is a connection, downloading program and data updates, and delivering those updates to the individual local devices as well as obtaining and storing device statistics, detecting when there is a connection, and uploading the device statistics to a server outside the network. Although the examples described herein are described as being used in the context of a school, the examples may be employed in any environment where access to the Internet is desired.

Examples described herein provide a local server for managing storage across client devices in an intermittent network. The local server may include a processor, and a memory communicatively coupled to the processor. The local server may also include an internet connection manager to manage data transfer from an internet to the local server, and a wireless local area network (LAN) access point to communicatively couple at least one local client device to the local server. The local server manages the local client device to use the local server as a proxy server. The local server may also include a local network manager. The local network manager may include an update manager to provide the local client device with data downloaded by the local server based on relevancy of the data to a user of the local client device.

The local network manager may include a discovery manager to discover the local client device in the LAN. The local network manager may include a configuration manager to automatically configure the local client device. The configuration manager may automatically configure the proxy settings of a browser of the local client device. The configuration manager installs a local agent on the local client device. The local agent may define how the local client device communicates with the local server. The local server restricts the local client device from accessing the internet through the local server.

The update manager downloads the missing files and wherein the missing files downloaded by the update manager comprises executable programs, data files, video files, audio files, audio-video files, documents, or combinations thereof. The timing of the missing files downloaded by the update manager is managed by the local server based on quality and speed of a connection to the internet. The local server, when access to the internet is obtained, downloads a configuration file. The configuration file may include instructions for the local server to manage the local client device. The local client device may be a printing device.

The files may include at least one executable application. The update manager may instruct the local client device to install the at least one executable application. The update manager may store at least one web page obtained from the internet locally, and serve the at least one web page to the local client device to mitigate the intermittent network connection. The update manager may determine available disk space on the local client device, and transfer data to the local client device to optimize utilization of the LAN by the local client device based on the available disk space on the local client device. The analytics manager may retrieve and analyze anonymized analytics data from the local client device.

Examples described herein provide a method of managing storage across client devices in an intermittent network. The method may include, with a local network manager executed by a processor of a local server, managing at least one local client device to use the local server as a proxy server. The method may also include, with an update manager of the local server, determining what data downloaded by the local server are stored on the local client device, predicting what data are to be relevant to a user of the local client device, and providing the local client device with the relevant data as predicted.

The method may also include, with a discovery manager executed by the processor, communicatively coupling the local client device to a local area network (LAN) access point of the local server, and with a configuration manager, automatically configuring the local client device. The method may also include, with an analytics manager, retrieving analytics data from the local client device.

Examples described herein provide a computer program product for managing storage across client devices in an intermittent network. The computer program product may include a computer readable storage medium including computer usable program code embodied therewith. The computer usable program code may, when executed by a processor, and with a local network manager, manage at least one local client device to use a local server as a proxy server. The computer usable program code may, when executed by the processor, and with an update manager provide the local client device with data downloaded by the local server based on a predicted relevancy of the data to a user of the local client device.

The computer program product may also include computer usable program code to, when executed by the processor, and with a discovery manager executed by the processor, communicatively couple the local client device to a local area network (LAN) access point of the local server, with a configuration manager, automatically configure the local client device, and with an analytics manager, retrieve analytics data from the local client device. The computer program product may also include computer usable program code to, when executed by the processor and with the update manager determine available disk space on the local client device, and transfer data to the local client device to optimize utilization of a LAN by the local client device based on the available disk space on the local client device.

As used in the present specification and in the appended claims, the term "intermittent" when referring to a network is meant to be understood broadly as any instance in which access to the network is discontinuous or access to the network is not economically desirable. The network may be intermittent when the bandwidth for upload and download speeds is not sufficient to serve those individuals who are seeking to access the network, or when the network simply does not work at all times during a period of time.

As used in the present specification and in the appended claims, the term "manager" when referring to a computing is meant to be understood broadly as any combination of computing device and/or associated computer readable or computer executable code that manages and schedules at least one process executed by a processing device.

Turning now to the figures, FIG. 1 is a block diagram of a local sever (101) for managing storage across client devices in an intermittent network, according to an example of the principles described herein. The local server (101) acts as a proxy server to at least one local client device (150-1, 150-2, 150-n, collectively referred to herein as 150). A proxy server may be any server computing device that acts as an intermediary for requests from the local client devices (150) seeking resources from other servers such as those that make up the Internet. A client (150) may connect to the local server (101) acting as a proxy server, request some service, such as a file, a connection, a web page, or other resource available from a different server and the proxy server may evaluate the request as a way to simplify and control its complexity. Proxy servers add structure and encapsulation to distributed computing systems, and may act as web proxies facilitating access to content on the World Wide Web.

The local server (101) may execute server applications that cause the local server (101) to function as a server computing device. Further, the local server (101) may include disk space sufficient to both store executable programs used or the instantiation of a local area network (LAN), the transfer of data between computing devices within and external to the LAN, and storage of data that may be pushed to local client devices (150) or maintained on the local server (101) for access by the local client devices (101).

Any number of local client devices (150) may be coupled to the local server (101), and the "n" denoted in local client device (150-n) indicates that any number of local client devices (150) from one to infinity may be communicatively coupled to the local server (101). The local client devices (150) may be any electrical device that may be coupled to the local server (101) such as, for example, desktop computing devices, laptop computing devices, tablet computing devices, mobile phones such as smart phones, printing devices, communications devices such as modems and routers, other computing devices, and combinations thereof. In an example where the setting for the local server (101) is a K-12 school, the local server (101) may be coupled to at least one printing devices for printing curriculum out for students, and may be coupled to at least one student computing devices where the students receive learning resources from the local server (101) on their student computing devices. The Internet (180), local server (101), and local client devices (150) form an overall system (100) that may be used to manage data transfer and usage within an intermittent network environment.

The local server (101) may be communicatively coupled to each of the local client devices (150) via at least one client device communication links (151-1, 151-2, 151-3, collectively referred to herein as 151). These client device communication links (151) may be any type of wired or wireless communication link, such as, for example, a Wi-Fi wireless local area networking (LAN) connection based on the IEEE 802.11 standards or a BLUETOOTH wireless technology standard. In this manner, the local server (101) and the local client devices (150) form a local area network (LAN).

The local server (101) may be coupled to an external network such as the Internet (180) where the local server (101) is able to upload and download data to and from other server devices that service the Internet through an internetwork communication link (181). The internetwork communication link (181) may be any wired or wireless communication link that allows the local server (101) to access at least one of the external servers located on the Internet, Because the computing network environment in which the local server (101) and local client devices (150) are implemented includes an intermittent connection to the Internet (180), the local server may restrict the local client devices'

(150) access to the Internet. Allowing the local client devices (150) to access the Internet (180) directly may be ineffective and futile since the intermittent access may not allow for uploads to or downloads from the Internet (180) to be accomplished. Thus, in the examples described herein, the local client devices (150) may not be allowed to directly access any network outside the LAN formed by the local server (101) and the local client devices (150).

The local server (101) may include a processor (102) and a memory device (103) communicatively coupled to the processor (102). Further, the local server (101) may also include an internet connection manager (124) to manage data transfer from the Internet (180) to the local server (101). A wireless local area network (LAN) access point (160) may also be included in the local server (101) to communicatively couple at least one of the local client devices (150) to the local server (101).

The local server may also include a local network manager (115) to, when executed by the processor (102), orchestrate all activities within the local server (101) including managing the LAN which includes the local client devices (150). In this manner, the local network manager (115) creates a network environment in which the local client devices (150) to use the local server (101) as a proxy server. As described in connection with FIG. 1 and throughout the description, the local network manager (115) serves to orchestrate the execution of a number of software and hardware elements within the local server including the internet connection manager (124), the update manager (122), and the LAN access point (160) as depicted in FIG. 1.

The local server (101) may also include an update manager (122). The update manager (122), when executed by the processor (102), downloads data from the Internet (180) for the local client devices (150), may determine what data is stored on the local client devices (150), and may push missing data to the local client devices (150) in response to a determination that the local client devices (150) are communicatively coupled to the local server (101). The update manager (122) may update software that is executed on the local client devices (150). Further, the update manager (122) may update data such as, for example, curriculum content in the local client devices (150) to maximize the ease-of management of the local client devices (150) within the LAN while minimizing any information technology (IT) administration overhead for managing content in the local client devices (150). Throughout the examples described herein, the downloaded content may include executable programs, data files, video files, audio files, audio-video files; documents, other types of data, and combinations thereof. Further, the content may include web pages. In this example, the update manager (122) described herein may store at least one web page obtained from the Internet (180) on the local server (101), and serve the at least one web page to the local client devices (150) to mitigate the intermittent network connection.

The update manager (122) may also manage a local copy of the core curriculum content on the local server (101). For example, the update manager (122) may monitors the following events (1) "Event UM-1 ("Internal: Notification from Local Network Manager (LNM) about a new content update available for computing devices"); and (2) Event UM-2 ("Internal: Notification from Local Network Manager (LNM) about a new application update available for computing devices"). Thus, the update manager (122) may facilitate in the updating of content and software applications that are present on the local client devices (150).

The update manager (122) may also, in one example, provide the local client devices (150) with data downloaded by the local server (101) based on relevancy of the data to a user of the local client device (150). In this example where the user is a teacher or a student within a classroom, the user may be studying a particular topic, and data defining applications and content that relate to that topic may be stored on the local client devices (150) for the user to utilize. However, data defining applications and content that do not relate to that topic may not be stored on the local client devices (150) and may, instead, be stored on the local server (101) or not downloaded to any device (101, 150) in the system (100). In this manner, relevant data may be pushed to the local client devices (150) while restricting irrelevant data from being downloaded to the local client devices (150). This intelligent storage of relevant data on the local client devices (150) ensures that data storage devices of the local client devices (150) retain space for the upload manager (122) to provide the local client devices (150) with updates to the applications and content currently on the local client devices (150) and preserves disk space on the local client devices (150). Thus, relevancy to a user may be broadly defined as relevant to a topic of study of the user at any particular time.

In one example, the update manager (122) may remove data from the local client devices (150) when it is determined that the local client devices (150) are no longer using that data. For example, if the students within the class are finished studying a certain topic, data regarding that topic may be removed from the local client devices (150) to make room for data relating to other topics.

In one example, the upload manager (122) may predict what data may be pushed to or removed from the local client devices (150). For example, students within a classroom may be at the end of a school term or school year. At this period in the education of the students, relatively less data may be located on their respective local client devices (150) because most topics have been covered in the preceding days of the term and few topics are being studied for the reminder of the term or school year. Thus, the upload manager (122) may predict the data needs of the users, and remove data from the local client devices (150) that are no longer relevant, push data to local client devices (150) that is newly relevant or to become relevant to the users, and retain in the local client devices (150) data that continues to be relevant to the users. This intelligent storage of relevant data on the local client devices (150) reduces or eliminates IT administration tasks that may otherwise be performed by an IT administrator. In one example, a configuration file described herein may be used to define when the update manager (122) is to push data to, remove data from, and retain data on the local client devices (150). The configuration file downloaded to the local server (101) may define instructions as to how the local server (101) and the update manager (122) are to manage the local client devices (150).

Figure 2:
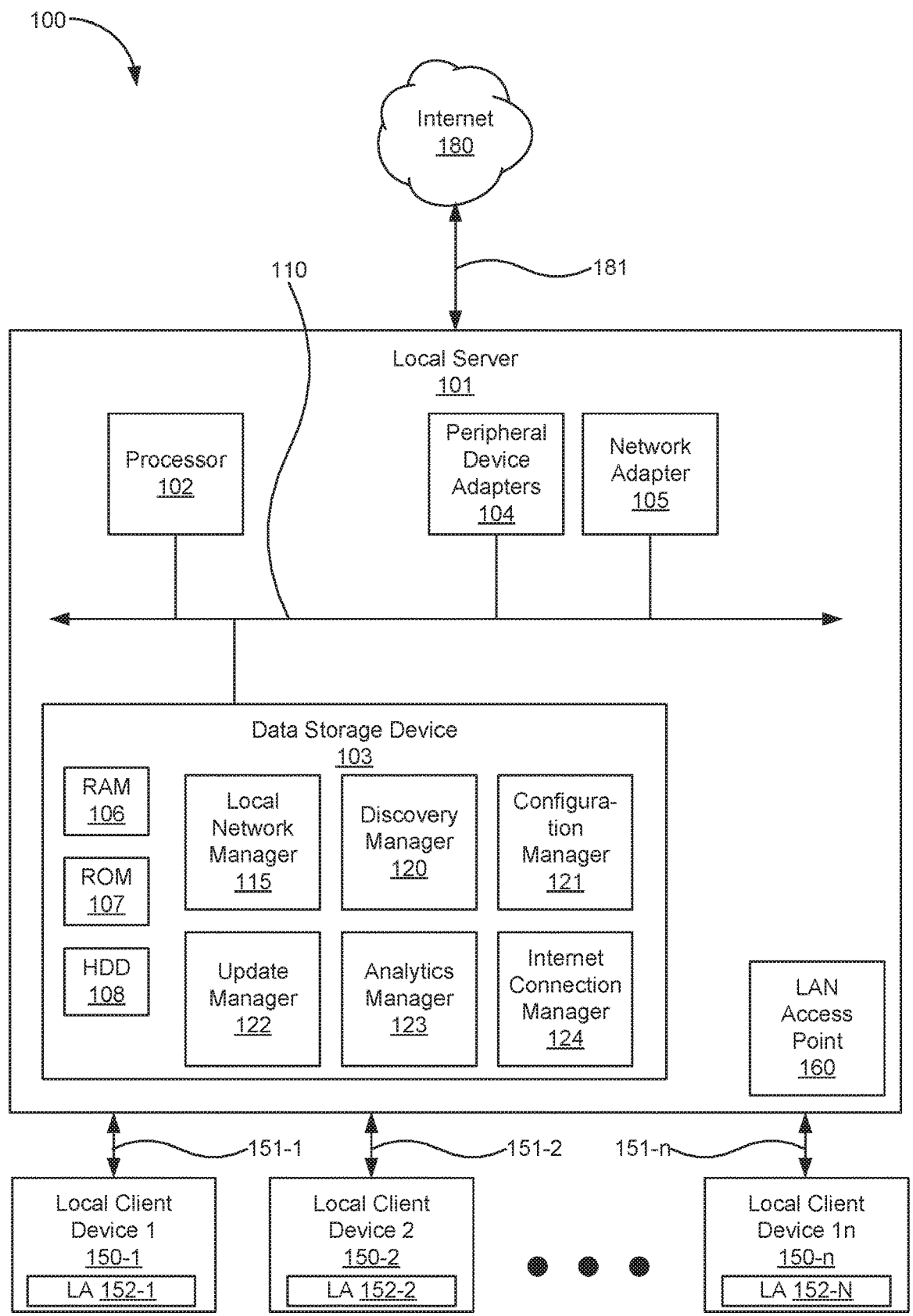
FIG. 2 is a block diagram of a local sever for managing storage across client devices in an intermittent network, according to an example of the principles described herein.

FIG. 2 is a block diagram of the local sever (101) for managing storage across client devices in an intermittent network, according to an example of the principles described herein. Similar elements present in the local sever (101) of FIGS. 1 and 2 are described above in connection with FIG. 1 and will be further described in connection with FIG. 2. The local server (101) may be utilized in any data processing scenario including, stand-alone hardware, mobile applications, through a computing network, or combinations thereof. Further, the local server (101) may be used in a computing network, a public cloud network, a private cloud network, a hybrid cloud network, other forms of networks, or combinations thereof where the local server (101) functions as a proxy server to the local client devices (150) in an intermittent network environment. In one example, the methods provided by the local server (101) may be provided as a service over a network by, for example, a third party. In this example, the service may include, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the local server (101) may be executed by a local administrator.

To achieve its desired functionality, the local server (101) includes various hardware components. Among these hardware components may be at least one processor (102), at least one data storage device (103), at least one peripheral device adapter (104), and at least one network adapter (105). These hardware components may be interconnected through the use of at least one busses and/or network connections. In one example, the processor (102), data storage device (103), peripheral device adapters (104), and a network adapter (105) may be communicatively coupled via a bus (110).

The processor (102) may include the hardware architecture to retrieve executable code from the data storage device (103) and execute the executable code. The executable code may, when executed by the processor (102), cause the processor (102) to implement at least the functionality of discovering the local computing devices (150) within the LAN of the system (100), configuring the local client devices (150) within the LAN, updating software and content stored on the local computing devices (150), retrieving and analyzing analytics information from the local computing devices (150) within the LAN, receiving relevant data from the Internet (180) and optimize bandwidth usage to obtain the data, orchestrate all the activities within the local server (101), communicate with the local client devices (150), perform other functions described herein, and combinations thereof, according to the systems and methods described herein. In the course of executing code, the processor (102) may receive input from and provide output to a number of the remaining hardware units.

The data storage device (103) may store data such as executable program code that is executed by the processor (102) or other processing device. As described herein, the data storage device (103) may specifically store computer code representing a number of applications that the processor (102) executes to implement at least the functionality described herein.

The data storage device (103) may include various types of memory modules, including volatile and nonvolatile memory. For example, the data storage device (103) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (103) as may suit a particular application of the principles described herein. In certain examples, different types of memory in the data storage device (103) may be used for different data storage needs. For example, in certain examples the processor (102) may boot from Read Only Memory (ROM) (107), maintain nonvolatile storage in the Hard Disk Drive (HDD) memory (108), and execute program code stored in Random Access Memory (RAM) (106).

The data storage device (103) may include a computer readable medium, a computer readable storage medium, or a non-transitory computer readable medium, among others. For example, the data storage device (103) may be, but not limited to, an electronic, magnetic, optical, electromagnetic, infrared, or semiconductor system, apparatus, or device, or any suitable combination of the foregoing, More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters (104, 105) within the local server (01) enable the processor (102) to interface with various other hardware elements, external and internal to the local server (101). For example, the peripheral device adapters (104) may provide an interface to input/output devices, such as, for example, a display device, a mouse, or a keyboard. The peripheral device adapters (104) may also provide access to other external devices such as an external storage device, a number of network devices such as, for example, servers, switches, and routers, the local client devices (150), other types of computing devices, and combinations thereof.

The peripheral device adapters (103) may also create an interface between the processor (102) and local client device (150) that is a printing device, or other media output device. The network adapter (104) may provide an interface to other computing devices within, for example, a network, thereby enabling the transmission of data between the local server (101) and other devices located within the network.

The local server (101) may also include a LAN access point (160) to communicatively couple at least one of the local client devices (150) to the local server (101); The Lan access point (160) may be any networking hardware that allows a Wi-Fi- or hardline-enabled device to connect to the LAN created by the local server (101) and the local client devices (150). In one example, the LAN access point (160) may be a communications router.

The local server (101) further includes a number of executable modules (115, 120, 121, 122, 123, 124) used in the implementation of the local server (101), The various modules (115, 120, 121, 122, 123, 124) within the local server (101) include executable program code that may be executed separately. In this example, the various modules may be stored as separate computer program products. In another example, the various modules (115, 120, 121, 122, 123, 124) within the local server (101) may be combined within a number of computer program products; each computer program product comprising a number of the modules (115, 120, 121, 122, 123, 124).

The local server (101) may include a local network manager (115) to, when executed by the processor (102), orchestrate all the activities within the local server (101). The local network manager (115) may coordinate various events across all the other modules (120, 121, 122, 123, 124) within the local server (101) such as, for example, a discovery manager (120), a configuration manager (121), an update manager (122), an analytics manager (123), and an internet connection manager (124). Each of these other modules (120, 121, 122, 123, 124) will now be described in more detail;

The discovery manager (120) discovers the local client devices (150) within a local area of the local server (101) that may be connected to the LAN via the LAN access point (160), Further, the discovery manager (120) may also monitor for the following events: (1) Event DM-1 ("a new local client device (150) requests for an IP address in the local area network"), (2) Event DM-2 ("a local client device (150) sends a dynamic host configuration protocol (DHCP) internet protocol (IP) address renewal request"), and (3) Event DM-3 ("send probes in the LAN to discover new local client devices (150)"). In this manner, the discovery manager (120) of the local sever (101), when executed by the processor (102), identifies and communicatively couples the local client devices (105) to the local server (101). In one example, the discovery manager (120) discovers the local client devices (150) within the LAN in an autonomous manner. With this autonomous discovery, the discovery manager (120) may reduce or eliminate IT administrator work to set the system (100) up for use within the intermittent network.

Once the local client devices (150) are discovered by the discovery manager (120), the local client devices (150) may be configured by the processor (102) executing the configuration manager (121). The configuration manager (121) configures the local client devices (150) including, for example, computing devices and printing devices in the LAN to maximize the ease-of-setup of local client devices (150) in LAN while minimizing IT administration overhead. In many emerging or developing countries, access to competent IT administrators may be rare and may increase expenses associated with providing the LAN via the local server (101). The configuration manager (121) may track of, for example, applications and content that are to be present on the local client devices (150). For example, in a scenario where the LAN is provided fora school, every local client device (150) operated by a student and/or teacher may be configured using the configuration manager (121). The configuration manager (121) may also host offline copies of OER content for use by the student and/or teacher who are operating the local client devices (150). In one example, the configuration manager (121) may monitor a number of events including the following.

Event CM-1 ("Internal: Notification from the local network manager (115) about a new computing device discovered in the local network". The configuration manager (121), when notified of a new local client device (150) in the LAN, may determine whether the new local client device (150) has the applications for the given scenario installed thereon. For example, in the school classroom setting, the configuration manager (121) may determine if the new local client device (150) has the applications used within the learning environment of the classroom. If the configuration manager (121) determines that the new local client device (150) does not have installed at least one of the applications, the configuration manager (121) may push the relevant applications to the new local client device (150) for installation.

The configuration manager (121) may also determine how much disk-space is available in the new local client device (150). If there is sufficient space, the configuration manager (121) may send data such as, core curriculum content to the new local client device (150). In this manner, the configuration manager (121) optimizes disk-utilization across all network devices including the data storage device (103) of the local server (101) and the data storage of the local client devices (150). Further, the configuration manager (121) ensures all the local client devices (150) have access to the right content with minimal performance issues for the users of the local client devices (150) such as, for example, teachers and/or students in the classroom.

The configuration manager (121) may also configure the browser(s) of the new local client device (150) such that web-proxy setting of the browser points back to the local sever (150). This ensures that if the new local client device (150), another local client device (150), or the local server (101) downloaded specific content from the Internet in an intermittent Internet scenario, the local server (101) tracks the content, and serves it to other local client devices (101) when requested. This prevents duplicated download of the same content, thereby conserving bandwidth.

Further, the configuration manager (121) of the local server (101) may also configure the browser(s) of the new local client device or the other local client devices (150) by adding individual bookmarks and quick-access-links to each of the offline-OERs that the local server (101) hosts for the local client devices (150). Thus, a student and/or teacher may easily access the OER material through the browser of his or her respective local client device (150).

Further, the configuration manager (121) may monitor Event CM-2 ("Internal: Notification from the local network manager (115) about a new printing device discovered in the local network"). As described herein, the local client devices (150) may include printing devices. The configuration manager (121) may monitor for and configure the printing device discovered by the discovery manager (120) such that the local server (101) and the local client devices (150) may utilize the functionality of the printing device.

Still further, the configuration manager (121) may cause a local agent (152-1, 152-2, 152-*n*, collectively referred to herein as 152) to be downloaded to and installed on each of the local client devices (150). The local agent may cause the local client devices (150) to communicate with local server (101). In other words, the local agent (152) defines how the local client devices (150) communicate with the local server (101). The local agent (152) may monitor the following events. Event LA-1 ("respond to the local server's (101) multicast discovery packet"), This event allows the discovery manager (120) to discover the local client devices (150) and causes the local client devices (150) to begin communications with the local server (101). Another event may include Event LA-2 ("Respond to the local server's (101) request to configure the local client devices (150)"). This event allows the configuration manager (121) to communicate with the local client devices (150) to configure the local client devices (150) as described herein. Another event may include Event LA-3 ("Respond to the local server's (101) request to update the local client devices (150)"), This event allows the update manager (122) to update the content and applications on the local client devices (150) as described herein. Further, another event may include Event LA-4 ("Respond to the local server's (101) request to upload analytics data"), This event allows the analytics manager (123) to request, retrieve, and analyze analytics information from the local client devices (150) within the LAN and transmit that analytics data to external servers on the Internet (180) as described herein.

The configuration manager (121) may perform its functions described herein autonomously. This autonomous configuration of the local client devices (150) reduces or eliminates IT administrator work to configure the local client devices (150) and set the system (100) up for use within the intermittent network.

The update manager (122), in addition to the description provided in connection with FIG. 1, when executed by the processor (102), downloads data from the Internet (180) for the local client devices (150), may determine what data is stored on the local client devices (150), and may push missing data to the local client devices (150) in response to a determination that the local client devices (150) are communicatively coupled to the local server (101) as described herein. The update manager (122) may update software that is executed on the local client devices (150). Further, the update manager (122) may update data such as, for example, curriculum content in the local client devices (150) to maximize the ease-of management of the local client devices (150) within the LAN while minimizing any information technology (IT) administration overhead for managing content in the local client devices (150). The update manager (122) may also manage a local copy of the core curriculum content on the local server (101). For example, the update manager (122) may monitor the following events, "Event UM-1 ("Internal: Notification from the local network manager (115) about a new content update available for computing devices"). Further, the update manager (122) may monitor Event UM-2 ("Internal: Notification from the local network manager (115) about a new application update available for computing devices"). The update manager (122) may receive these notifications from the local network manager (115) on a regular basis or as the updates are made available. Further, the update manager may send instructions to the local client devices (150) to install any executable programs such as applications on the local client devices (150). Thus, the update manager (122) may facilitate in the updating of content and applications that are present on the local client devices (150).

The analytics manager (123), when executed by the processor (102), requests, retrieves, and analyzes analytics information from the local client devices (150) within the LAN including, for example, computing devices and printing devices. In one example, the analytics manager (123) may monitor for Event AM-1 ("send notification to the local client devices (150) to retrieve device and user analytics information"). In one example, the device and user analytics information requested, retrieved, and analyzed by the analytics manager (123) may be made anonymous so as to protect the identity of the local client device (150) and/or the user. The analytics data may be sent by the analytics manager (123) and the local server (101) to other server devices outside the system (100) located on the Internet (180). This analytics data may be used to determine the manner in which the users are utilizing the local client devices (150).

The local server (101) may also include an internet connection manager (124) to manage data transfer from the Internet (180) to the local server (101) as described herein. In other words, the internet connection manager (124) manages and schedules data transfer from the Internet (180) to the local sever (101) based at least on the availability of a connection to the Internet. A wireless local area network (LAN) access point (160) may also be included in the local server (101) to communicatively couple at least one of the local client devices (150) to the local server (101). The internet connection manager (124) may receive relevant data from the Internet (180) and optimize bandwidth usage to achieve the download. If the local server (101) is not connected to Internet (180), this module may remain dormant. The internet connection manager (124) may monitor the following events. A first event may include Event ICM-1 ("check for any content or application updates in a number of pre-defined websites"). Thus, the internet connection manager (124) may determine whether any content or applications obtained from the Internet (180) contain updates. Another event may include Event ICM-2. ("a notification from local network manager (115) to upload analytics data obtained by the analytics manager (123) to the Internet"). Thus, in this manner, the internet connection manager (124) assists the other modules (115, 120, 121, 122, 123) in performing their tasks and doing so by identifying when access to the intermittent connection to the Internet (180) is available or when a most economical or expeditious transfer of data to and from external server devices present within the Internet (180).

In one example, the intermittent access to the Internet (180) may be made available to the local server (101) at certain predesignated times of the day as a type of periodic throttling of access to the Internet (180). In another example, the intermittent access to the Internet (180) may be a result of a payment plan in which data transfers are payable by the megabyte or gigabyte of data uploaded or downloaded. Still further, the intermittent access to the Internet (180) may be a result of insufficiently reliable infrastructure within the hardware that makes up the Internet (180). In any of the situations or similar situations, the internet connection manager (124) may identify when a connection to the Internet (180) has or may be established, and uploads and downloads data as described herein at those times when the connection to the Internet is available.

In one example, the local server (101) executing the update manager (122), for example, may monitor for and download a configuration file. The downloaded configuration file may define instructions as to how the local server (101) is to manage the local client devices (150), and may include updates to the modules (115, 120, 121, 122, 123, 124). Further, the downloaded configuration file may provide instructions as to which resources including content and applications available on the Internet (180) should be downloaded to the local server (101) and/or pushed to the local client devices (150). These instructions may be provided by an IT administrator who services a plurality of local servers (101) and who may be instructed by a controlling organization or individual such as a ministry of education employee or a private curriculum administrator.

When the local server (101) is powered on, the local server (101) may initialize the LAN access point (160) to provide internet protocol (IP) addresses to requesting computing and printing devices among the local client devices (150). In one example, DHCP may be used as the protocol to initiate this communication link between the local server (101) and the local client devices (150). The local server (101), executing the discovery manager (120), may periodically send out local multicast packets to discover any statically-configured computing and/or printing devices among the local client devices (150) within the LAN. The local server (101) may track all the devices in the LAN and update the list of connected local client devices (150) at a pre-configured frequency.

When the local server (101) discovers at least one local client device (150), the local server (101) may, by executing the configuration manager (121) and update manager (122), query each of the local client devices (150) and record its capabilities including its processing capabilities, operating system (OS), total and available disk space, and a list of applications installed on the local client devices (150) and content stored on the local client devices (150). In an example where the local client device (150) is a printing device, the local server (101) may determine the printing device's capabilities including, for example, if the printing device can print in color, if the printing device can print in black and white, if the printing device can perform duplex printing, of the printing device can scan documents, other printing device capabilities, and combinations thereof. This discovery of capabilities of the local client devices (150) serves to minimize the use of IT administration in installing and rendering functional the local server (101). In many emerging and developing areas of the world, it may prove difficult to find individuals with the knowledge to set up a computer network, and the local server's (101) ability to self-install and self-configure the LAN reduces or eliminates IT administration. a self-aware local server (101) and associated network takes the guess-work out of device discovery and mapping along with any additional or subsequent device management.

For each of the local client devices (150) that the local server (101) identifies in the LAN, the local server (101) performs a number of activities while executing the configuration manager (121) and the update manager (122). First, the local server (101) ensures that each of the local client devices (150) have all the relevant applications installed. This minimizes the IT administration overhead for managing individual devices. Further, the local server (101) ensures that the local client devices (150) have a local copy of core content such as core curriculum content when the local client devices (150) are capable of storing the core content. This ensures that the users of the local client devices (150) such as students and teachers have the content accessible the quickest way without any network-related latency problems.

The local server (101) also makes sure that the local client devices' (150) browser settings have the correct web-proxy setting, pointing the local client devices (150) back to the local server (101). This ensures optimal usage of network resources in the LAN and eliminates unnecessary duplicate downloads of content from the Internet, thereby saving valuable bandwidth. Further, the local server (101) ensures that the browsers of the local client devices (150) have individual bookmarks and quick-access-links to each of the offline-OER that the local server (101) hosts for the users. This ensures that the users such as the students and teachers can quickly and easily access local OER content. The local server (101) thus creates a self-aware local cloud that minimizes IT administration involvement and takes the guesswork away from device configuration so that teachers and students will find their local client devices (150) performing as expected without any human intervention.

The local server (101) also tracks the OS version and application versions in each of the local client devices (150). Executing the update manager (122), the local server (101) updates individual local client devices (150) without downloading the same update from the Internet multiple times, thereby saving valuable bandwidth. Further, the local server (101) keeps track of content versions in each of the local client devices (150). As there is updated content from publishers and education organizations such a department of ministry of education, the local server (101) downloads the content and any updates to that content once and pushes the content to all the local client devices (150). In one example, content may also be uploaded to the local server (101) locally through a universal serial bus (USB) storage device, and the local server (101), executing the update manager (122), is responsible to push the updated content to all relevant computing devices. In this example, the source of the content may simply send the USB storage device to an individual associated with the local server (101) with instructions to communicatively couple the USB storage device to the local server (101), One aspect of enterprise IT administration work is to ensure that all devices in the LAN are up-to-date. For a system with minimal, intermittent, or no Internet connectivity, the local server assists in updating all the local client devices (150) and content stored therein by downloading relevant updates once, and propagating them across devices, saving bandwidth.

Further, the local server (101) may collect anonymous usage data for users and the local client devices (150) such as the computing and printing devices by executing the analytics manager (123). The local server (101) may sort them in pre-defined ways, and upload them to, for example, an education organization's data-cloud or other appropriate cloud-location. This assists the education organization in justifying their investments in the deployment of the local server (101) and associated local client devices (150) in, for example, a K-12 school, without adding extra work for teachers, principals and other educational administrators to collect and report data.

Figure 3:
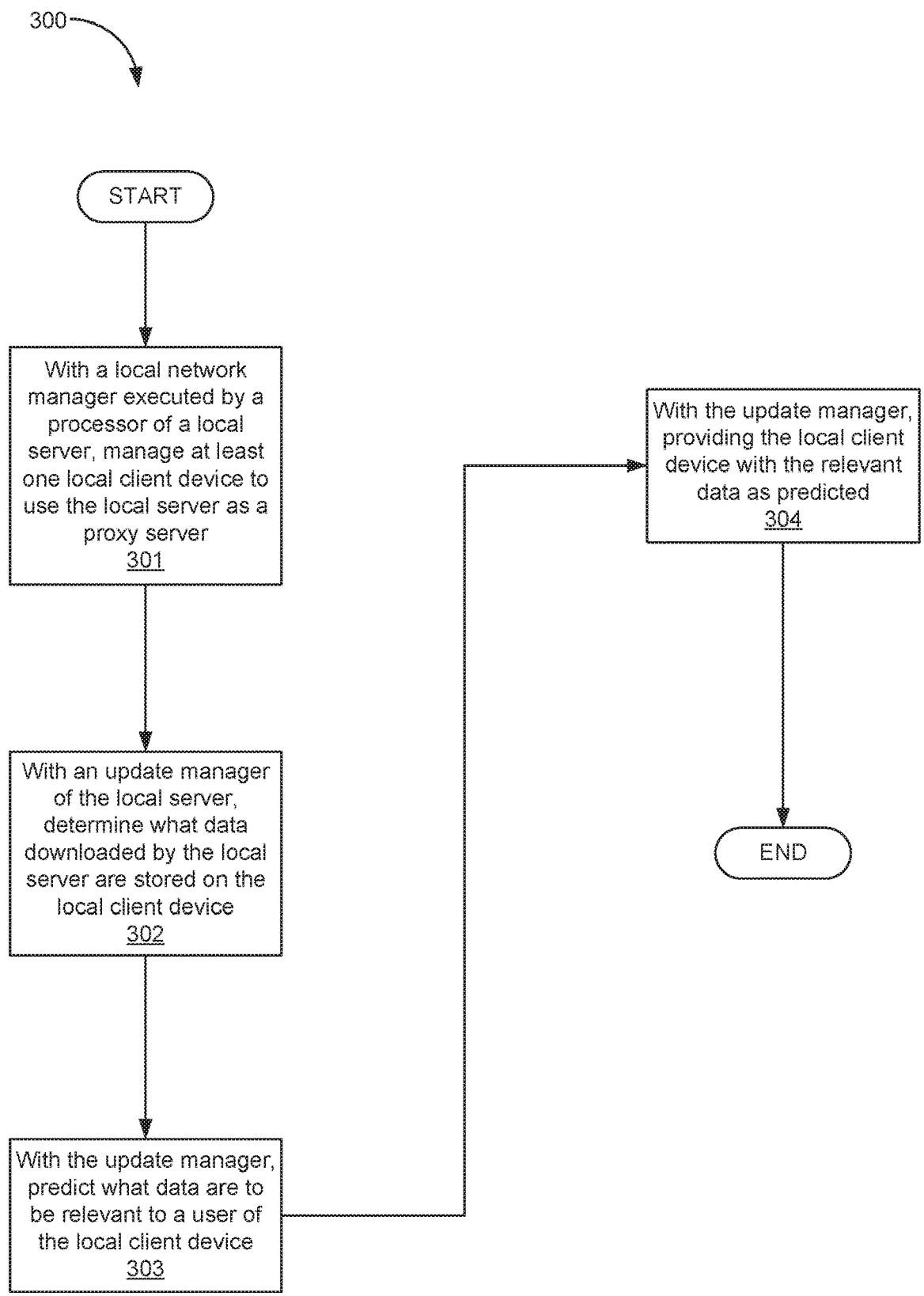
FIG. 3 is a flowchart showing a method of managing storage across client devices in an intermittent network, according to an example of the principles described herein.

FIG. 3 is a flowchart showing a method (300) of managing storage across client devices in an intermittent network, according to an example of the principles described herein. The method (300) may include, with the local network manager (115) executed by the processor (102) of the local server (101), managing (block 301) at least one local client device (150) to use the local server (101) as a proxy server.

The update manager (122) may be executed to determine (block 302) what data downloaded by the local server (101) are stored on the local client devices (150). The update manager (122) may also predict (block 303) what data are to be relevant to a user of the local client devices (150). As described herein, the upload manager (122) may predict what data may be pushed to or removed from the local client devices (150). For example, students within a classroom may be at the end of a school term or school year. At this period in the education of the students, relatively less data may be located on their respective local client devices (150) because most topics have been covered in the preceding days of the term and few topics are being studied for the reminder of the term or school year. Thus, the upload manager (122) may predict the data needs of the users, and remove data from the local client devices (150) that are no longer relevant, push data to local client devices (150) that is newly relevant or to become relevant to the users, and retain in the local client devices (150) data that continues to be relevant to the users. This intelligent storage of relevant data on the local client devices (150) reduces or eliminates IT administration tasks that may otherwise be performed by an IT administrator.

The processor (102) may execute the update manager (122) to provide (block 304) the local client devices (150) with the relevant data as predicted. By so doing, the update manager (122) is able to ensure that all local client devices (150) include relevant data on their respective data storage devices in a timely manner and when relevant.

Figure 4:
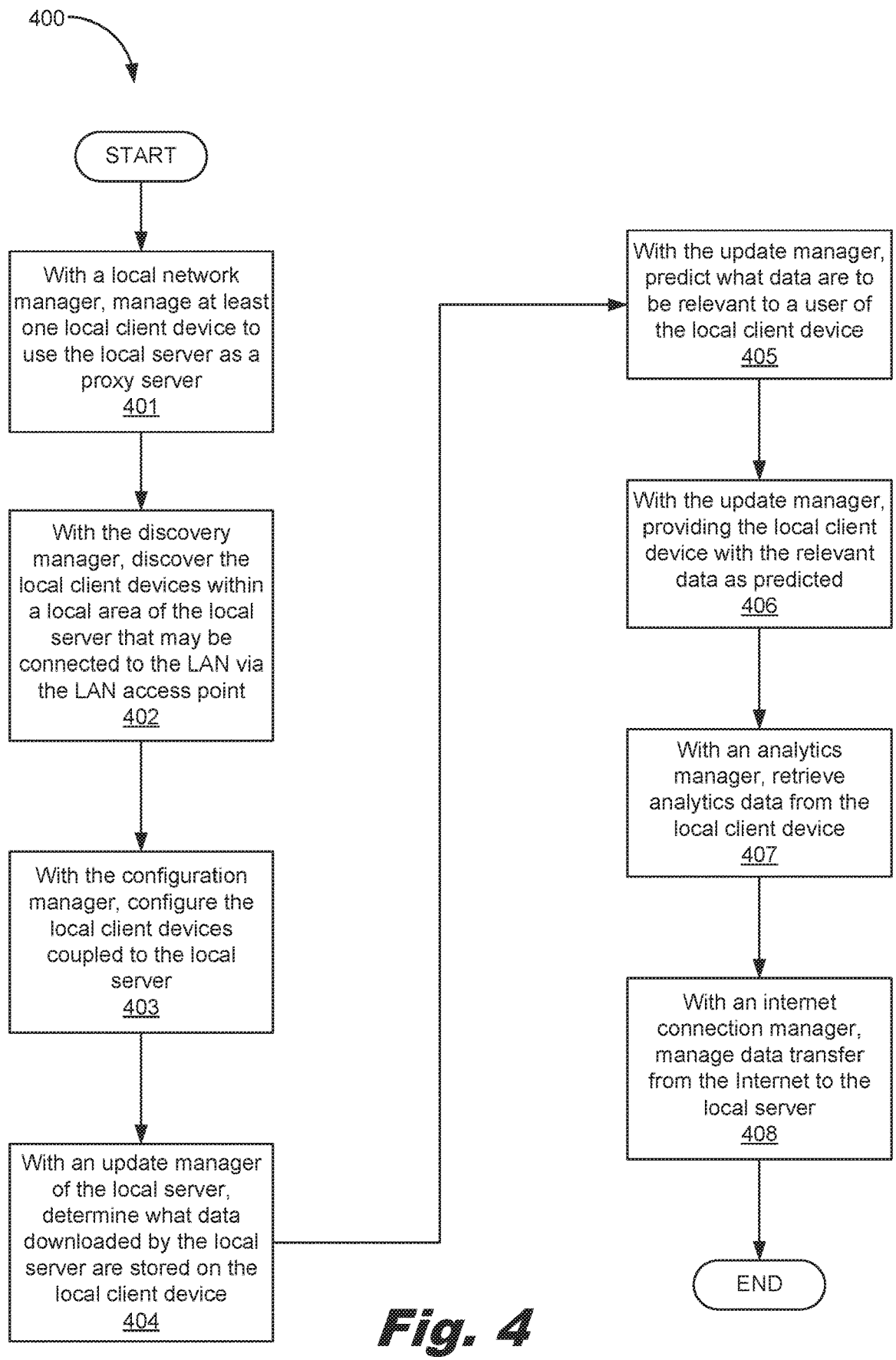
FIG. 4 is a flowchart showing a method of managing storage across client devices in an intermittent network, according to an example of the principles described herein.

FIG. 4 is a flowchart showing a method (400) of managing storage across client devices in an intermittent network, according to an example of the principles described herein. The method (400) may include managing (block 401) at least one local client device (150) to use the local server (101) as a proxy server. The local network manager (115) orchestrates all activities within the local server (101) including managing the LAN which includes the local client devices (150). The discovery manager (120) may be executed to discover (block 402) the local client devices (150) within a local area of the local server (101) that may be connected to the LAN via a LAN access point (160).

The method (400) may also include configuring (block 403) the local client devices (150) in the LAN by executing the configuration manager (121). The configuration manager (121) may identify what content and applications the local client devices (150) have, checks what disk space each local client device (150) has, configures browsers on the local client devices (150) to have a web-proxy setting that points to the local server (101) and adds bookmarks and quick-access links to the browsers to at least one offline OER content stored on the local server (101), and configures any printing devices that are identified as local client devices (150) within the LAN.

Further, the update manager (122) may be executed by the processor (102) to determine (block 404) what data downloaded by the local server (101) are stored on the local client devices (150), predict (block 405) what data are to be relevant to a user of the local client devices (150), and provide (block 406) the local client devices (150) with the relevant data as predicted as described herein in connection with blocks 302 through 304 of FIG. 3.

With the analytics manager (123), the local server (101) may retrieve (block 407) analytics data from the local client devices (150) within the LAN. The analytics manager (123) may also transmit that analytics data to external servers on the Internet (180).

The method (400) of FIG. 4 may also include managing (block 408) data transfer from the Internet (180) to the local server (101) by executing the internet connection manager (124). A wireless local area network (LAN) access point (160) communicatively couples at least one of the local client devices (150) to the local server (101). The internet connection manager (124) may receive relevant data from the Internet (180) and optimize bandwidth usage to achieve the download. If the local server (101) is not connected to Internet (180), the internet connection manager (124) may remain dormant. The internet connection manager (124) may determine whether any content or applications obtained from the Internet (180) contain updates, and assists the other modules (115, 120, 121, 122, 123) in performing their tasks and doing so by identifying when access to the intermittent connection to the Internet (180) is available or when a most economical or expeditious transfer of data to and from external server devices present within the Internet (180).

Figure 5:
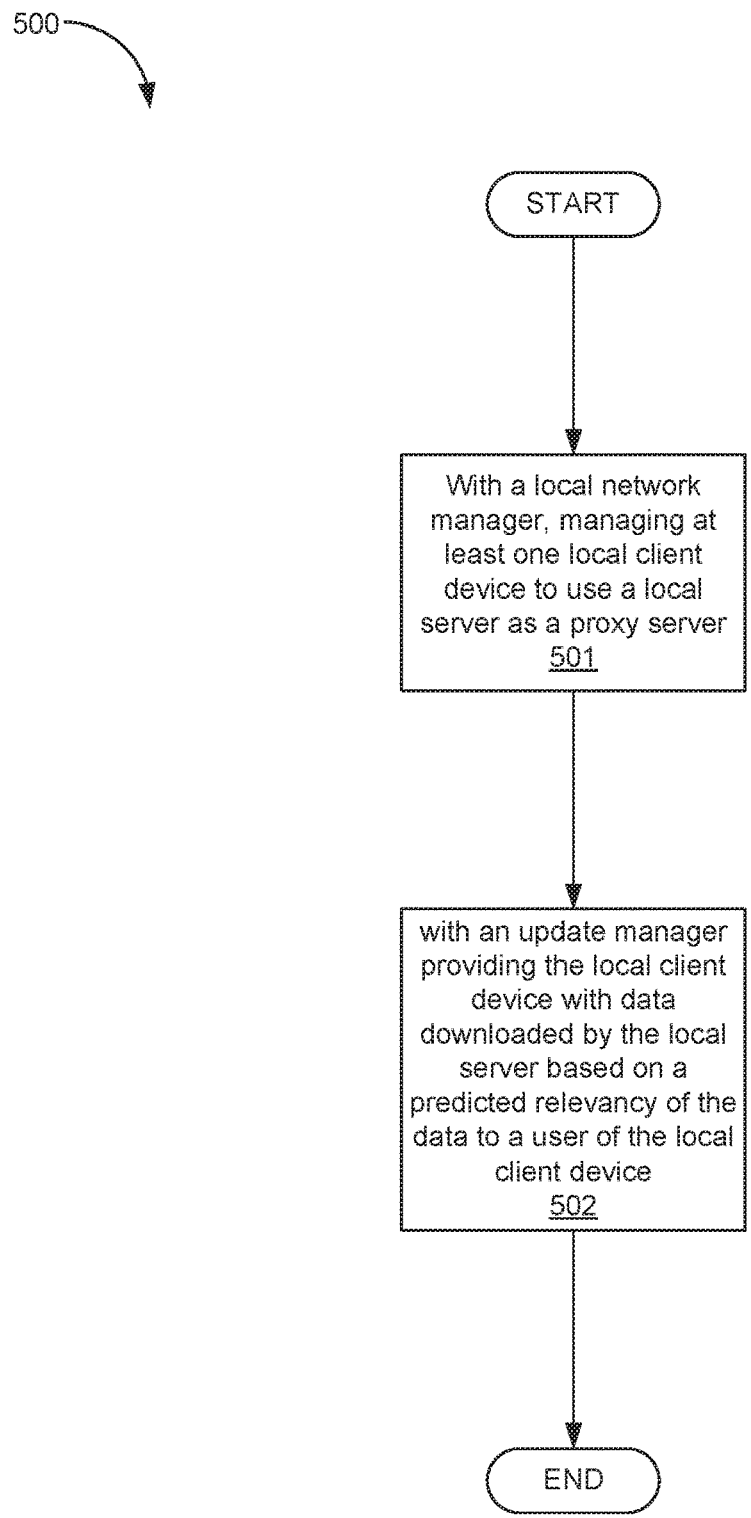
FIG. 5 is a flowchart showing a method of managing storage across client devices in an intermittent network, according to an example of the principles described herein.

FIG. 5 is a flowchart showing a method (500) of managing storage across client devices in an intermittent network, according to an example of the principles described herein. The method (500) may include, with the local network manager (115), executed by the processor (102) of the local server (101), managing (block 501) at least one local client device (150) to use the local server (101) as a proxy server. By executing the update manager (122), the method (500) may also include providing (block 502) the local client devices (150) with data downloaded by the local server (101) based on a predicted relevancy of the data to a user of the local client devices (150).

Figure 6:
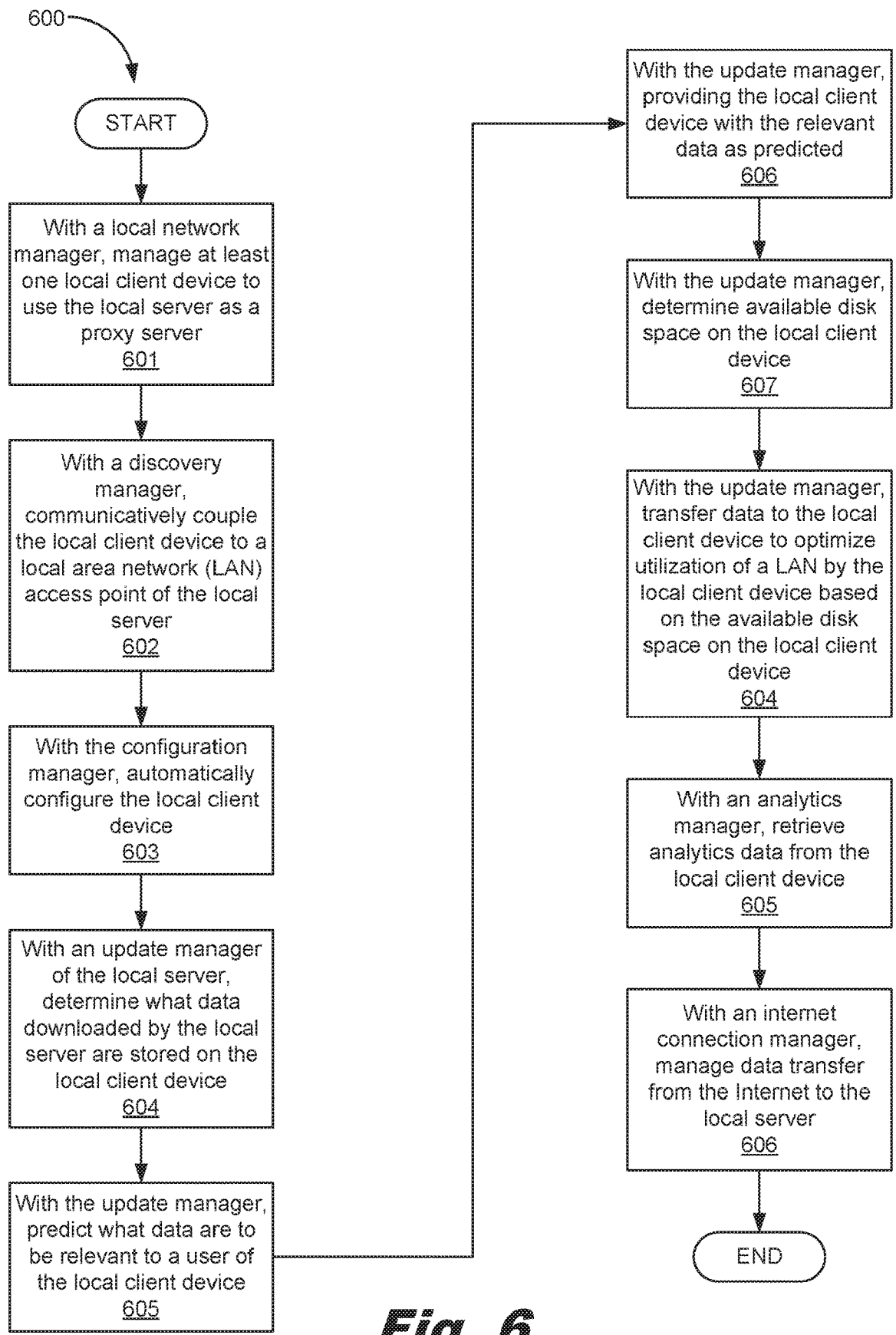
FIG. 6 is a flowchart showing a method of managing storage across client devices in an intermittent network, according to an example of the principles described herein.

FIG. 6 is a flowchart showing a method (600) of managing storage across client devices in an intermittent network, according to an example of the principles described herein. Similar elements present in the method depicted in Figs of FIGS. 4 and 6 are described above and will be further described in connection with FIG. 6. Specifically, blocks 401-403 and 406-408 are identical to FIGS. 601-603 and 604-606, respectively. However, at block 604, the method (600) may also include the update manager (122) may be executed by the processor (102) to determine (block 604) what data downloaded by the local server (101) are stored on the local client devices (150); predict (block 605) what data are to be relevant to a user of the local client devices (150), and provide (block 606) the local client devices (150) with the relevant data as predicted as described herein in connection with blocks 302 through 304 of FIG. 3.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer; special purpose computer, or other programmable data processing apparatus to produce a machine, such that the computer usable program code, when executed via, for example, the processor (102) of the local server (101) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

In the examples described herein, the local server (101) may be sent to a recipient within an area of the world that experiences intermittent network connectivity, and may be preloaded with data including executable programs and content. In this example, because access to the Internet (180) may be so sporadic and intermittent, it may be difficult for the local sever (101) to connect to the Internet (180) long enough to even download or upload data as described herein. Thus, a private company or government entity such as a ministry of education may purchase the local server (101), store the applications and content on the local server (101), and send the preloaded local server (101) to the intended destination. For example, if the intended destination is a school located in an area of a country where little or no access to the Internet (180) is available, the local server (101) may work for its intended purpose anyway with the desired data preloaded on the local server (101).

The specification and figures describe a local server for managing storage across client devices in an intermittent network. The local server may include a processor, and a memory communicatively coupled to the processor. The local server may also include an internet connection manager to manage data transfer from an internet to the local server, and a wireless local area network (LAN) access point to communicatively couple at least one local client device to the local server. The local server manages the local client device to use the local server as a proxy server. The local server may also include a local network manager. The local network manager may include an update manager to provide the local client device with data downloaded by the local server based on relevancy of the data to a user of the local client device.

The local server described herein utilizes a host of modules to significantly reduce the overhead of installing technology in an area where access to the Internet is intermittent or where no bandwidth is available to connect to Internet, and also supports all local client devices including computing and printing devices in the process. This complete, close-loop and workable solution creates an easy-to-deploy and easy-to-manage system that, for example, school administrators and educational organizations may count on to deliver superior learning and teaching experiences to students and teachers, even when there is limited or no Internet access.

The preceding description has been presented to illustrate and describe examples of the principles described. This description is not intended to be exhaustive or to limit these principles to any precise form disclosed. Many modifications and variations are possible in light of the above teaching.

What is claimed is:

1. A local server for managing storage across client devices in an intermittent network, comprising:
   a processor;
   a memory communicatively coupled to the processor;
   an internet connection manager to manage data transfer from an internet to the local server;
   a wireless local area network (LAN) access point to communicatively couple at least one local client device to the local server, wherein the local server manages the local client device to use the local server as a proxy server; and
   a local network manager, the local network manager comprising:
      an update manager to push data downloaded by the local server device to the local client device based on relevancy of the data to a topic of study of a user of the local client device.

2. The local server of claim 1, wherein the local network manager comprises a discovery manager to discover the local client device in the LAN.

3. The local server of claim 1, wherein the local network manager comprises a configuration manager to automatically configure the local client device.

4. The local server of claim 3, wherein the configuration manager automatically configures the proxy settings of a browser of the local client device.

5. The local server of claim 3, wherein the configuration manager installs a local agent on the local client device, wherein the local agent defining how the local client device communicates with the local server.

6. The local server of claim 1, wherein the local server restricts the local client device from accessing the internet through the local server.

7. The local server of claim 1, wherein the update manager downloads missing files and wherein the missing files downloaded by the update manager comprises executable programs, data files, video files, audio files, audio-video files, documents, or combinations thereof.

8. The local server of claim 7, wherein the timing of the missing files downloaded by the update manager is managed by the local server based on quality and speed of a connection to the internet.

9. The local server of claim 1, wherein the local server, when access to the internet is obtained, downloads a configuration file, the configuration file comprising instructions for the local server to manage the local client device.

10. The local server of claim 1, wherein the local client device is a printing device.

11. The local server of claim 1, wherein the files comprise at least one executable application and wherein the update manager instructs the local client device to install the at least one executable application.

12. The local server of claim 1, wherein the update manager:
   stores at least one web page obtained from the internet locally; and
   serves the at least one web page to the local client device to mitigate the intermittent network connection.

13. The local server of claim 1, wherein the update manager:
   determines available disk space on the local client device; and
   transfers data to the local client device to optimize utilization of the LAN by the local client device based on the available disk space on the local client device.

14. The local server of claim 1, comprising an analytics manager to retrieve and analyze anonymized analytics data from the local client device.

15. A method for managing storage across client devices in an intermittent network, comprising:
   with a local network manager executed by a processor of a local server, managing at least one local client device to use the local server as a proxy server; and
   with an update manager of the local server:
   determining what data downloaded by the local server are stored on the local client device;
   predicting what data are to be relevant to a user of the local client device based on a topic of study by the user and a period of time in a school year; and
   providing the local client device with the relevant data as predicted.

16. The method of claim 15, comprising:
   with a discovery manager executed by the processor, communicatively coupling the local client device to a local area network (LAN) access point of the local server; and
   with a configuration manager, automatically configuring the local client device.

17. The method of claim 16, comprising, with an analytics manager, retrieving analytics data from the local client device.

18. A computer program product for managing storage across client devices in an intermittent network, the computer program product comprising:
   a non-transitory computer readable storage medium comprising computer usable program code embodied therewith, the computer usable program code to, when executed by a processor:
   with a local network manager, manage at least one local client device to use a local server as a proxy server; and
   with an update manager:
      manage a local copy of curriculum content on the local server; and
      provide the local client device with the curriculum content downloaded by the local server based on a predicted relevancy of the curriculum content to a user of the local client device.

19. The computer program product of claim 18, comprising computer usable program code to, when executed by the processor:

with a discovery manager executed by the processor, communicatively couple the local client device to a local area network (LAN) access point of the local server;

with a configuration manager, automatically configure the local client device; and with an analytics manager, retrieve analytics data from the local client device.

20. The computer program product of claim 18, comprising computer usable program code to, when executed by the processor and with the update manager:

determine available disk space on the local client device; and transfer the curriculum content to the local client device to optimize utilization of a LAN by the local client device based on the available disk space on the local client device.

* * * * *